UNITED STATES PATENT OFFICE.

ARTHUR W. CHASE, OF NEWPORT NEWS, VIRGINIA.

CHOCOLATE COMPOUND AND METHOD OF PREPARING THE SAME.

1,038,723.  Specification of Letters Patent.  Patented Sept. 17, 1912.

No Drawing.  Application filed November 10, 1910.  Serial No. 591,707.

*To all whom it may concern:*

Be it known that I, ARTHUR W. CHASE, a citizen of the United States, and a resident of Newport News, in the county of Warwick and State of Virginia, have invented an Improvement in Chocolate Compounds and Methods of Preparing the Same, of which the following description is a specification.

This invention relates to a chocolate compound and method of preparing the same. In order that the principles thereof may be understood, I shall set forth the manner best known to me for carrying the invention into practice.

Heretofore cocoa compounds have been formed as dough-like masses, or molded into solid form or pulverized, consisting of the cocoa beans from which the natural oils have been removed and with which is mixed a small proportion of condensed milk and other ingredients. Such compounds, when in dough-like or molded form are not readily measured, or in molded form are not readily dissolved, and in any form are not conveniently handled in the preparation of beverages. They are, also, comparatively expensive to manufacture. It is the object of my invention to provide an inexpensive but very nutritious chocolate compound that may be readily handled and measured in a semi-fluid state, one that is a true chocolate preparation in readily soluble form, and that is readily prepared for drinking.

Condensed milk is of a semi-fluid consistency of about 1.36 specific gravity, readily adapting it for measurement and handling. I flavor or impregnate a suitable quantity thereof with a proper proportion of chocolate, preferably grated to a fine powder, and wherein is retained all or substantially all the natural oil, in preferably the proportion of nine or ten parts of condensed milk by weight to one part of chocolate. I thus retain substantially the consistency of the condensed milk and obtain a compound almost immediately soluble in use, and at the same time, use a minimum amount of chocolate, but an amount entirely sufficient for the purpose, since by retaining the natural oils, I preserve the entire nutriment. If desired the chocolate may be added to the condensed milk when in the pulpy state of its manufacture. The mixing of the chocolate and condensed milk may be and preferably is done at a high temperature to quickly dissolve the former. This compound I preferably sweeten, as this enhances the keeping qualities, particularly when the compound has been sealed up and the package is opened up for use from time to time. The sugar for sweetening may be applied by using sweetened chocolate or sweetened condensed milk or by adding sugar to unsweetened chocolate and unsweetened condensed milk.

The compound thus prepared may be sealed and kept indefinitely or may be immediately used. The compound is thus a true chocolate compound in readily soluble form and always ready for use. The beverage is simply, readily and exceedingly inexpensively prepared therefrom and herein it differs markedly from the preparation of the usual chocolate beverage. In preparing the beverage I dissolve the compound in water. While the compound may be dissolved cold and the beverage then be heated, I prefer to dissolve it in boiling hot water as I effect the desired result more readily and quickly, and the beverage should always be served hot. Care need not be exercised lest the water be overheated, since the best results are obtained with highly heated water. Moreover, I have discovered in the course of my experiments that when the chocolate has been thoroughly mixed with the condensed milk, temperature changes do not thereafter affect it. Since, therefore, I may use varying temperatures of water, the beverage cannot be spoiled by variations in temperature, and can be readily and properly prepared by an inexperienced person.

I employ no cream in the preparation of the beverage, but when it has been poured, heated, into individual cups for use, or before it is so distributed, I thoroughly whip or beat it, as by using a rotary egg beater. Thus, I not only insure a complete mixing and dissolving, but I lighten and render more delicate the beverage and raise a froth resembling whipped cream upon its surface. If the beverage be beaten or whipped when undistributed, the froth may be distributed into the individual cups in any suitable way.

Having thus described my invention, I desire it to be understood that what I claim as my invention and desire to secure by Letters Patent is:—

1. A food product composed of condensed milk impregnated with chocolate and containing the natural oils thereof, but retaining substantially the consistency of the condensed milk.

2. The process of making a food product which consists in impregnating condensed milk with chocolate, while maintaining substantially the normal consistency of the former.

3. A food product composed of substantially nine parts of condensed milk by weight mixed with one part of chocolate retaining its natural oils.

4. That process of making a food product which consists in impregnating condensed milk of a specific gravity of about 1.36 with chocolate containing the natural oils thereof, and in maintaining during said impregnation a consistency of the mixture of about 1.36.

5. That process of making a food product which consists in impregnating condensed milk with chocolate while preserving the natural oils of the chocolate, and maintaining a consistency of the mixture of about 1.36.

In testimony thereof I have signed my name to this specification in the presence of two subscribing witnesses.

ARTHUR W. CHASE.

Witnesses:
R. H. FOWLE,
WM. W. MILLER.